(12) United States Patent
Al Khafaji et al.

(10) Patent No.: US 11,688,114 B2
(45) Date of Patent: *Jun. 27, 2023

(54) SYSTEMS AND METHODS FOR GENERATING DYNAMIC PIPELINE VISUALIZATIONS

(71) Applicant: PALANTIR TECHNOLOGIES INC., Denver, CO (US)

(72) Inventors: Salar Al Khafaji, Amsterdam (NL); James Thompson, London (GB); Joseph Hashim, Kent (GB); Joseph Rafidi, Mountain View, CA (US); Parvathy Menon, Palo Alto, CA (US); Patrick Szmucer, London (GB); Robert Kruszewski, London (GB); Stawomir Mucha, Bielsko-Biala (PL); Tyler Uhlenkamp, New York, NY (US); Vilmos Ioo, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,168

(22) Filed: Feb. 14, 2022

(65) Prior Publication Data
US 2022/0165009 A1    May 26, 2022

Related U.S. Application Data

(63) Continuation of application No. 16/598,804, filed on Oct. 10, 2019, now Pat. No. 11,257,263.

(60) Provisional application No. 62/749,336, filed on Oct. 23, 2018.

(51) Int. Cl.
*G06T 3/40* (2006.01)
*G06T 11/20* (2006.01)

(52) U.S. Cl.
CPC .............. *G06T 11/206* (2013.01); *G06T 3/40* (2013.01)

(58) Field of Classification Search
CPC ................................. G06T 11/206; G06T 3/40
USPC ........................................................ 345/428
See application file for complete search history.

(56) References Cited

U.S. PATENT DOCUMENTS

| | | | |
|---|---|---|---|
| 8,683,389 B1 | 3/2014 | Bar-Yam et al. | |
| 8,713,467 B1 | 4/2014 | Goldenberg et al. | |
| 2010/0138431 A1 | 6/2010 | Bator et al. | |
| 2010/0287512 A1 | 11/2010 | Gan et al. | |
| 2013/0132867 A1 | 5/2013 | Morris et al. | |
| 2013/0229416 A1 | 9/2013 | Krajee et al. | |
| 2014/0019879 A1 | 1/2014 | Krajee et al. | |
| 2014/0189651 A1* | 7/2014 | Gounares | G06F 11/3636 717/125 |
| 2015/0355794 A1 | 12/2015 | Spaulding | |
| 2016/0196201 A1 | 7/2016 | Seto et al. | |
| 2016/0283345 A1 | 9/2016 | Gounares et al. | |

(Continued)

*Primary Examiner* — Jin Ge
(74) *Attorney, Agent, or Firm* — Sheppard Mullin Richter & Hampton LLP (57) ABSTRACT

In some embodiments, a method comprises obtaining a pipeline of operations, the pipeline of operations including a plurality of functions providing any of one or more modification operations or visualization operations for a plurality of datasets. A first dynamic visualization of the pipeline of operations at a first level of granularity is generated. A second dynamic visualization of the pipeline of operations at a second level of granularity is generated in response to user input.

18 Claims, 7 Drawing Sheets

(56) References Cited

U.S. PATENT DOCUMENTS

2017/0177008 A1 6/2017 Chaudhary et al.
2017/0177263 A1 6/2017 Das et al.

* cited by examiner

SYSTEMS AND METHODS FOR GENERATING DYNAMIC PIPELINE VISUALIZATIONS

CROSS REFERENCE TO RELATED APPLICATION

This application is a continuation of U.S. application Ser. No. 16/598,804, filed Oct. 10, 2019, which claims priority to U.S. Provisional application Ser. No. 62/749,336, filed Oct. 23, 2018, each of which is hereby incorporated by reference in its entirety.

TECHNICAL FIELD

This disclosure pertains to systems for generating pipeline visualizations. More specifically, this disclosure pertains to generating dynamic pipeline visualizations.

BACKGROUND

Under some approaches, users may view pipelines that include multiple operations on datasets. Typically, such pipelines are rendered in a single view that present the entire pipeline to the user. However, pipelines often include many different datasets (e.g., hundreds or thousands of datasets), operations, and/or the like, which can cause the pipeline to appear cluttered or unreadable (e.g., because the visual elements are too small).

SUMMARY

A claimed solution rooted in computer technology overcomes problems specifically arising in the realm of computer technology. In various implementations, a computing system is configured to obtain a pipeline of operations. The pipeline of operations may include functions that provide operations (e.g., modification operations and/or or visualization operations) for a plurality of datasets. A first dynamic visualization of the pipeline of operations is generated at a first level of granularity (e.g., a default level of granularity). For example, the first dynamic visualization of the pipeline of operations may comprise a visual representation of the entire pipeline of operations, but at a relatively low level of detail (e.g., showing an overall structure of the pipeline, but not the individual datasets or functions). In response to user input, a second dynamic visualization of the pipeline of operations is generated at a second level of granularity (e.g., at a lower or higher level of granularity relative to the first level of granularity). For example, a user may select a portion of the pipeline of operations in the first dynamic visualization of the pipeline of operations, which may then cause the system to zoom-in on that portion of the pipeline of operations.

In some embodiments, when a user "zooms-in," the resulting dynamic visualization may present additional information that was not presented in the prior dynamic visualization (e.g., other datasets of the pipeline of operations).

In some embodiments, a user may "zoom-out" from a portion of the pipeline of operations. For example, a user may have previously "zoomed-in" on the portion of pipeline of operations from the first dynamic visualization of the pipeline of operations, and then subsequently "zoomed-out" to another dynamic visualization having a third level of granularity between the first and second levels of granularity (e.g., showing more datasets than the first dynamic visualization, but fewer than the second dynamic visualization).

Various embodiments of the present disclosure include systems, methods, and non-transitory computer readable media configured to obtain a pipeline of operations, the pipeline of operations including a plurality of functions providing any of one or more modification operations or visualization operations for a plurality of datasets. A first dynamic visualization of the pipeline of operations at a first level of granularity is generated. A second dynamic visualization of the pipeline of operations at a second level of granularity is generated in response to user input.

In some embodiments, the first dynamic visualization of the pipeline of operations comprises a default visualization of the pipeline of operations.

In some embodiments, the second dynamic visualization of the pipeline of operations comprises a zoomed-in view of a portion of the pipeline of operations relative to the first dynamic visualization of the pipeline of operations.

In some embodiments, the second dynamic visualization of the pipeline includes a representation of at least one dataset not represented in the first dynamic visualization of the pipeline of operations.

In some embodiments, the systems, methods, and non-transitory computer readable media further configured to perform generating a third dynamic visualization of the pipeline of operations at a third level of granularity. The system of claim 5, wherein the third dynamic visualization of the pipeline of operations comprises a zoomed-out view of a portion of the pipeline of operations relative to the second dynamic visualization of the pipeline of operations, and comprises a zoomed-in view of the portion of the pipeline of operations relative to the first dynamic visualization of the pipeline of operations. The system of claim 5, wherein the third dynamic visualization of the pipeline of operations includes a representation of at least one data set not represented in the first dynamic visualization of the pipeline of operations, and does not include at least one data set represented in the second dynamic visualization of the pipeline of operations.

In some embodiments, the systems, methods, and non-transitory computer readable media further configured to perform obtaining a plurality of pipeline schedules, each of the pipeline schedules indicating a time or frequency a respective pipeline of the plurality of pipeline schedules is to be executed; and overlaying a respective visual indicator for each of the plurality of pipeline schedules on at least the first dynamic visualization of the pipeline of operations at the first level of granularity, each of the respective visual indicators identifying a corresponding pipeline schedule of the plurality of pipeline schedules.

In some embodiments, the relative spatial relationships are maintained between the first and second dynamic visualizations of the pipeline of the operations.

In some embodiments, a spatial distance between operations of the pipeline of operations represent a relative or absolute processing time for those operations.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

A claimed solution rooted in computer technology overcomes problems specifically arising in the realm of computer technology. In various implementations, a computing system is configured to obtain a pipeline of operations. The pipeline of operations may include functions that provide operations (e.g., modification operations and/or or visualization operations) for a plurality of datasets. A first dynamic visualization of the pipeline of operations is generated at a first level of granularity (e.g., a default level of granularity). For example, the first dynamic visualization of the pipeline of operations may comprise a visual representation of the entire pipeline of operations, but at a relatively low level of detail (e.g., showing an overall structure of the pipeline, but not the individual datasets or functions). In response to user input, a second dynamic visualization of the pipeline of operations is generated at a second level of granularity (e.g., at a lower or higher level of granularity relative to the first level of granularity). For example, a user may select a portion of the pipeline of operations in the first dynamic visualization of the pipeline of operations, which may then cause the system to zoom-in on that portion of the pipeline of operations.

In some embodiments, when a user zooms-in on a particular portion of the pipeline of the operations, the resulting dynamic visualization may present additional information that was not presented in the prior dynamic visualization (e.g., other datasets of the pipeline of operations).

Figure 1:
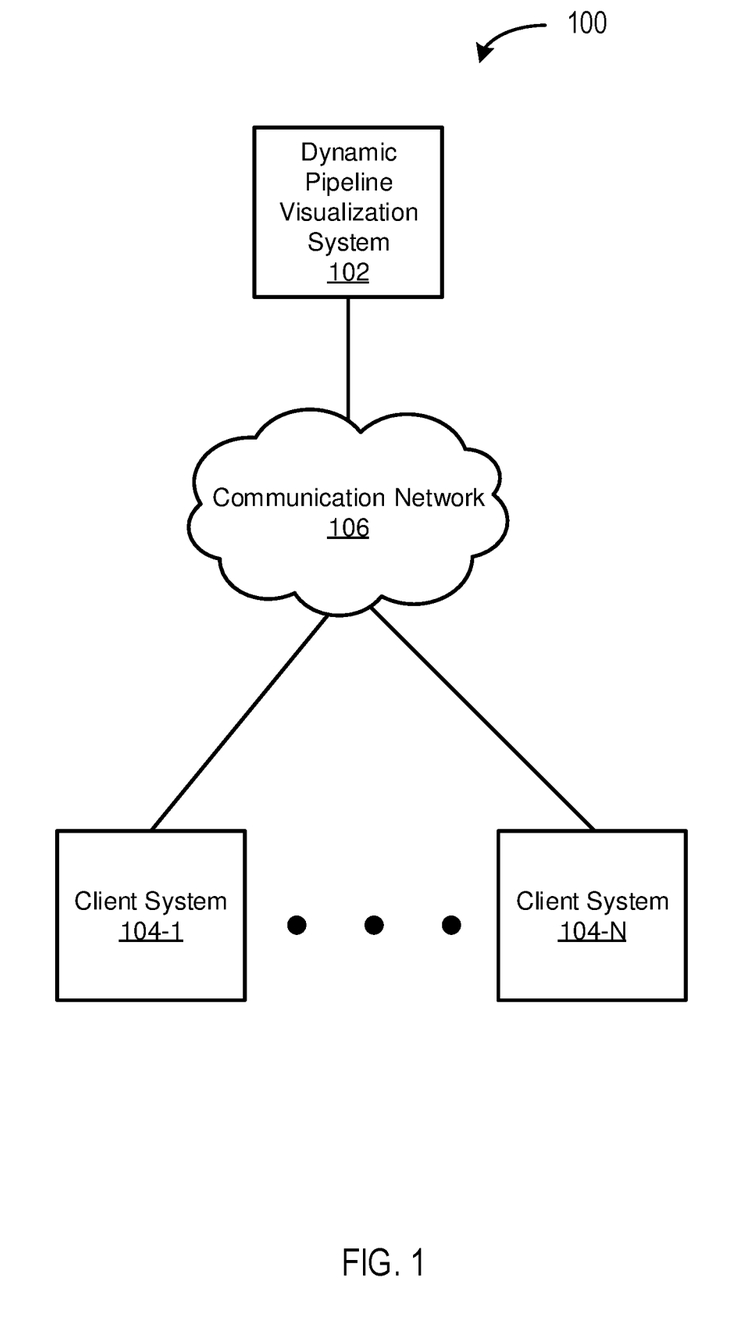
FIG. 1 depicts a diagram of an example system for dynamically generating and presenting pipeline visualizations according to some embodiments.

FIG. 1 depicts a diagram 100 of an example system for dynamically generating and presenting pipeline visualizations according to some embodiments. In the example of FIG. 1, the system includes a dynamic pipeline visualization system 102, client systems 104-1 to 104-N (individually, the client system 104, collectively, the client systems 104), and a communication network 106.

The dynamic pipeline visualization system 102 may function to manage (e.g., create, read, update, delete) pipelines. A pipeline may include a set of nodes with connections (e.g., "edges") between nodes(s), where the output of one node is the input of a next node. A node may represent one or more datasets and/or one or more functions providing operations (e.g., modification operations and/or visualization operations) to be performed on one or more datasets. For example, a pipeline may be a data pipeline, a software deployment pipeline (e.g., continuous integration pipeline, and/or continuous deployment pipeline), and/or the like. In some embodiments, a pipeline may include one or more pipeline paths (or, simply, "paths"). A path may include multiple nodes and connections between nodes, and different paths may be executed sequentially, in parallel, and/or otherwise. In some embodiments, a path itself may be a pipeline. Accordingly, as used herein, the term "pipeline" may refer to a collection of paths and/or particular path(s) within a larger pipeline. Additionally, the term "pipeline" may refer to the underlying set of operations, datasets, and/or the like, and/or it may refer to a representation thereof (e.g., a graphical representation of nodes, connections, and/or the like). In various embodiments, functionality of the dynamic pipeline visualization system 102 may be performed by one or more servers (e.g., a cloud-based server) and/or other computing devices (e.g., desktop computers, laptop computers, mobile devices, and/or the like).

In some embodiments, the dynamic pipeline visualization system 102 may function to generate and/or present dynamic visualizations (e.g., graphical user interfaces) of pipelines. For example, a pipeline may include many nodes and/or many datasets, and it may not be possible to present all of the nodes and/or datasets of the pipeline in a single view (e.g., a graphical user interface screen) such that the information is useable (e.g., readable). Accordingly, the dynamic pipeline visualization system 102 may present a pipeline in a view that is usable (e.g., readable) and that may be dynamically updated (e.g., in real-time and/or based on user input).

In some embodiments, the dynamic pipeline visualization system 102 may function to dynamically update pipeline visualizations to present a pipeline, and/or or portions thereof, at different levels of granularity. Levels of granularity may refer to a relative or absolute presentation scale of a graphical representation of a pipeline (or, "pipeline visualization"), a relative or absolute resolution of a pipeline visualization, and/or a relative or absolute amount of information presented in a pipeline visualization. For example, the dynamic pipeline visualization system 102 may display a visualization of an entire pipeline, albeit at a relatively low-level of granularity (e.g., enough detail to identify an overall structure of the pipeline, but not enough detail to identify all of the datasets or operations of the pipeline). The dynamic pipeline visualization system 102 may update a pipeline visualization in real-time (e.g., in response to user input) to generate a visualization having a higher-level of granularity (e.g., by zooming-in) and/or a lower-level of granularity (e.g., by zooming-out).

In some embodiments, the dynamic pipeline visualization system 102 may function to present pipeline schedules. A pipeline schedule may be a schedule for a when a pipeline, and/or one or more paths within a pipeline, are scheduled to be executed. A pipeline schedule may refer to a specific date/time, a frequency (e.g., daily at 6:00 AM), and/or the like. For example, a pipeline schedule may indicate that one path is scheduled to be executed (e.g., to build a binary or software object, compile and/or deploy code, and/or the like) daily at 6:00 AM, another path is scheduled to be executed weekly on Monday at 9:00 AM, and/or the like. In some embodiments, the dynamic pipeline visualization system 102 may graphically present various pipeline schedules onto a pipeline. For example, the dynamic pipeline visualization system 102 may indicate scheduled pipelines using different colors (e.g., red, white, blue) for different schedules, and also indicate a schedule for each of those different pipeline schedules (e.g., via a mouseover on the individual path segments and/or nodes). The graphical representation of pipeline schedules may, for example, allow users to easily identify existing pipelines instead of creating new pipelines, which may be computationally expensive.

The client systems 104 may function to present pipelines and/or interact with pipelines. For example, a client system 104 may display one or more GUIs including various dynamic pipeline visualizations. In some embodiments, functionality of the client systems 104 may be performed by one or desktop computers, laptop computers, mobiles devices, servers and/or other computing devices.

The communications network 106 may represent one or more computer networks (e.g., LAN, WAN, or the like) or other transmission mediums. The communication network 110 may provide communication between the dynamic pipeline visualization system 102 and client systems 104, and/or other systems/engines described herein. In some embodiments, the communication network 106 includes one or more computing devices, routers, cables, buses, and/or other network topologies (e.g., mesh, and the like). In some embodiments, the communication network 106 may be wired and/or wireless. In various embodiments, the communication network 106 may include the Internet, one or more wide area networks (WANs) or local area networks (LANs), one or more networks that may be public, private, IP-based, non-IP based, and so forth.

Figure 2:
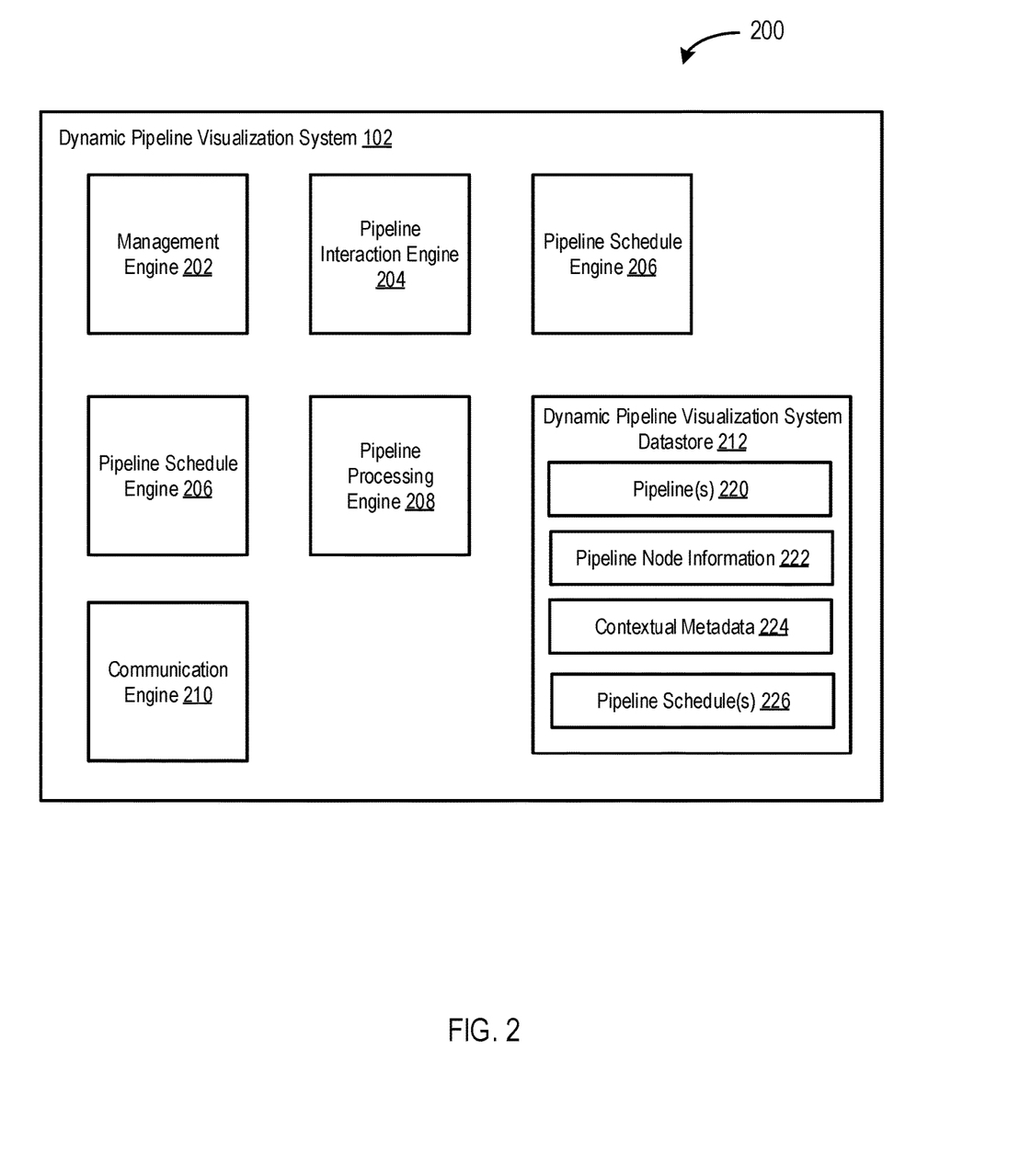
FIG. 2 depicts a diagram of an example of a dynamic pipeline visualization system according to some embodiments.

FIG. 2 depicts a diagram 200 of an example of a dynamic pipeline visualization system 102 according to some embodiments. In the example of FIG. 2, the dynamic pipeline visualization system 102 includes a management engine 202, a pipeline interaction engine 204, a pipeline schedule engine 206, a pipeline processing engine 208, a communication engine 210, and a dynamic pipeline visualization system datastore 212.

The management engine 202 may function to manage (e.g., create, read, update, delete, or otherwise access) pipeline(s) 220 stored in the dynamic pipeline visualization system datastore 212, pipeline node information 222 stored in the dynamic pipeline visualization system datastore 212, contextual information 224 stored in the dynamic pipeline visualization system datastore 212, pipeline schedule(s) 226, and/or other data stored in the dynamic pipeline visualization system datastore 212 and/or other datastores. The management engine 202 may perform any of these operations manually (e.g., by a user interacting with a GUI) and/or automatically (e.g., triggered by one or more of the engines 204-210). Like other engines described herein, some or all of the functionality of the management engine 202 may be included in one or more other engines (e.g., engines 204-210).

Figure 3A:
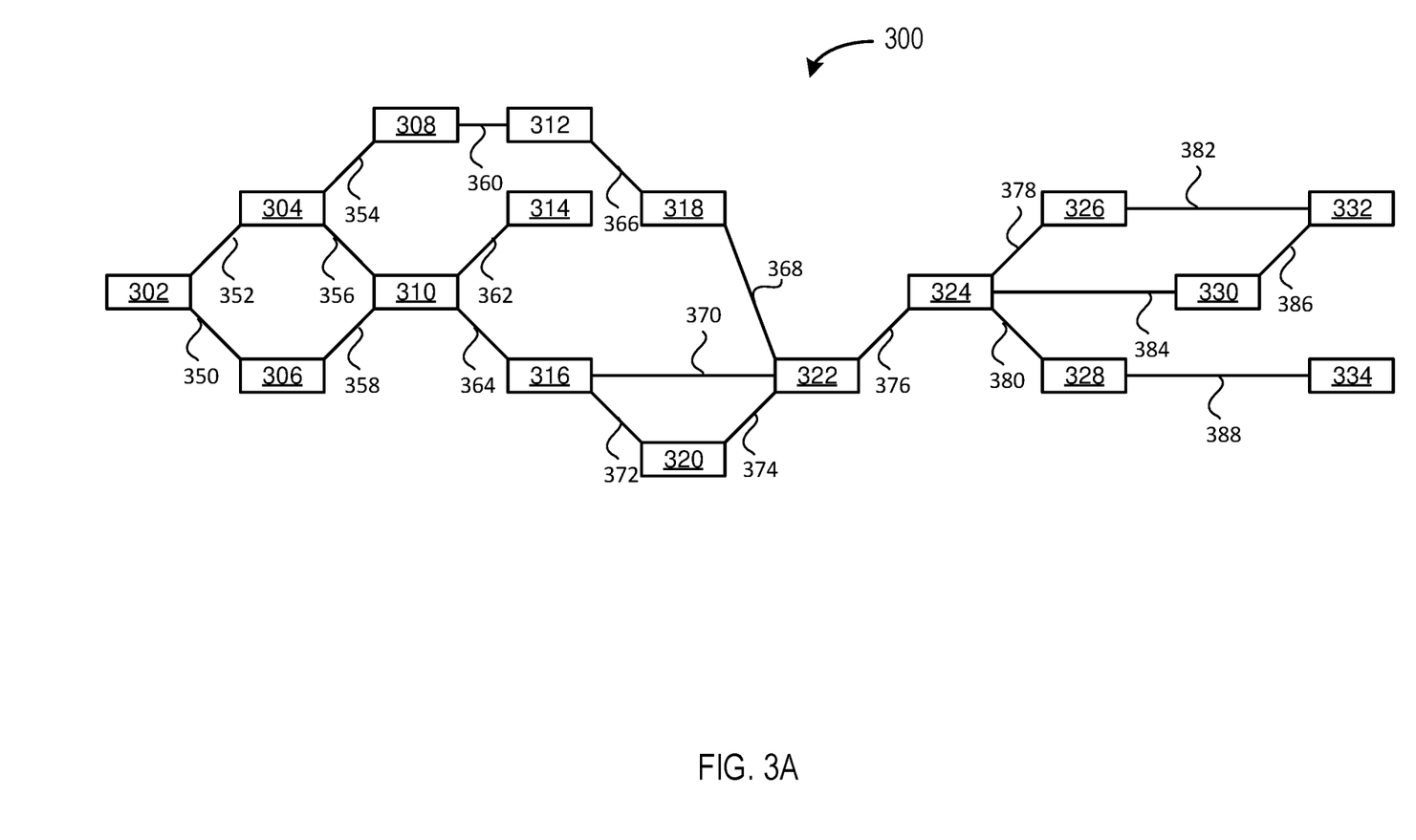
FIG. 3A-C depicts diagrams of example dynamic visualizations of a pipeline according to some embodiments.
Figure 3B:
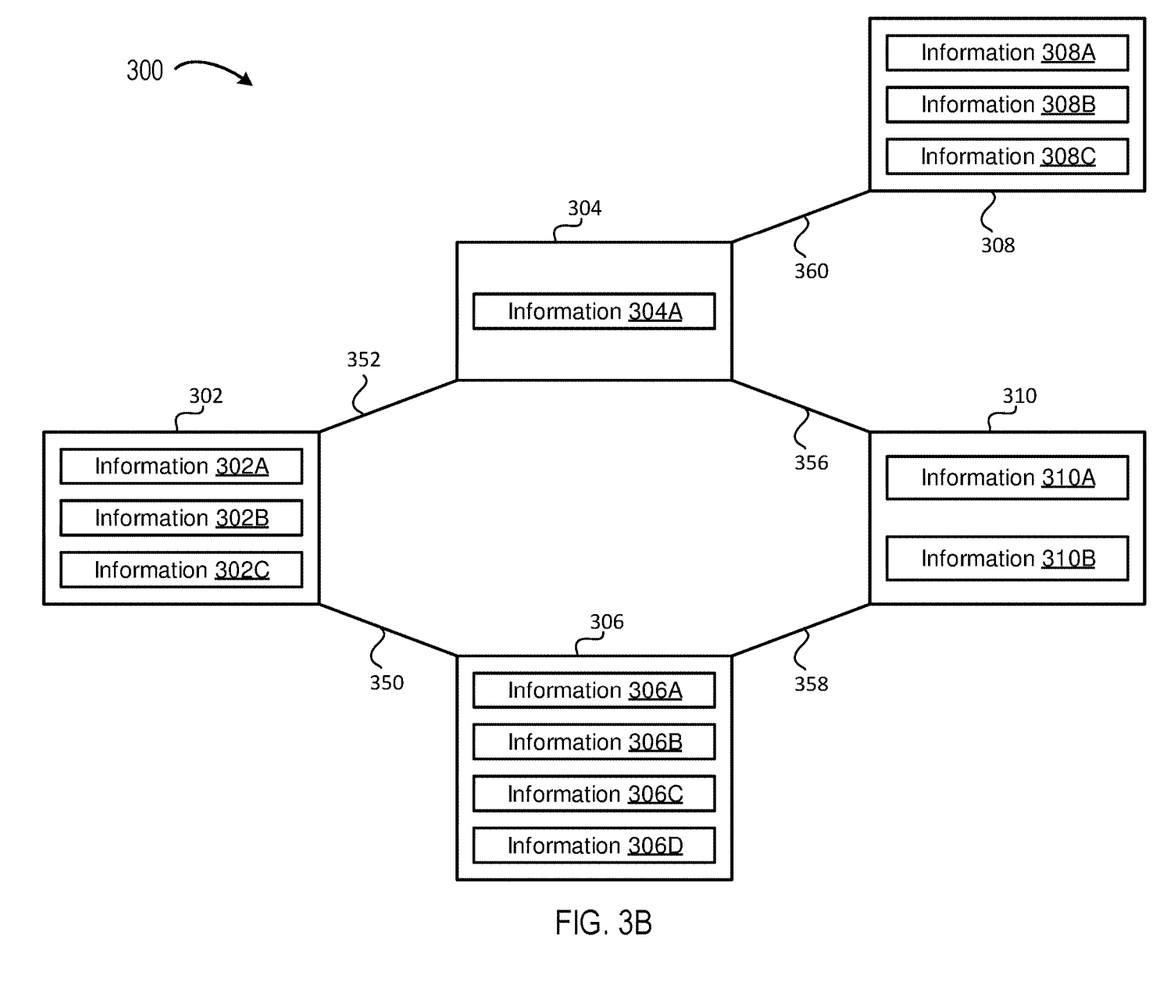
Figure 3C:
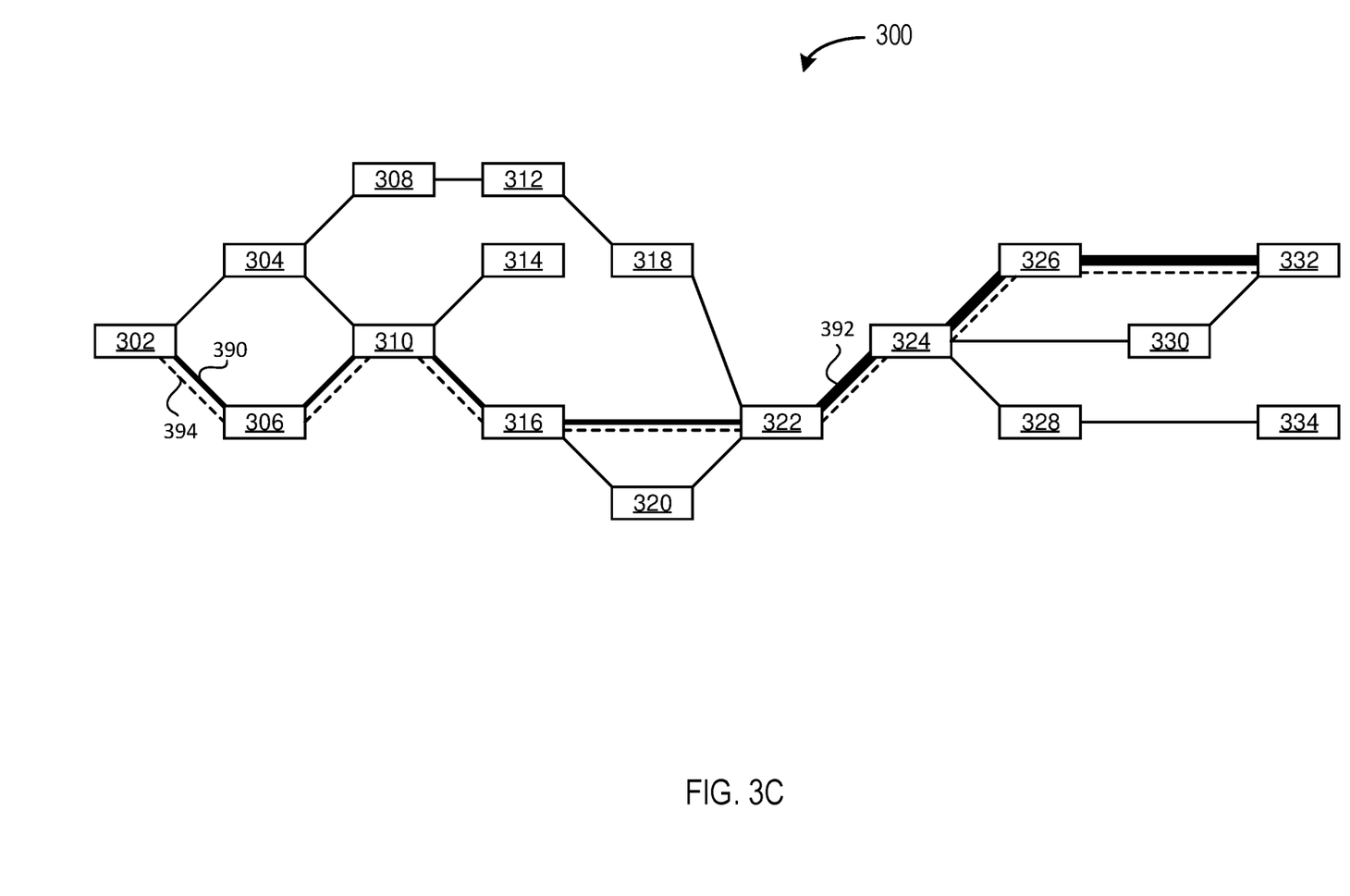

The pipeline interaction engine 204 may function to obtain one or more pipelines 220. A pipeline 220 may include multiple connected nodes, and each of the nodes may be associated with pipeline node information 222. Pipeline node information 222 may include functions and/or datasets, and/or references thereto. Accordingly, a pipeline 220 may provide one or more functions for providing operations (e.g., modification operations or visualization operations) on a plurality of datasets. An example pipeline is shown in FIGS. 3A-C.

In some embodiments, a pipeline 220 may include one or more pipelines of operations. A pipeline of operations may include one or more functions. For example, the functions may provide one or more modification operations and/or visualization operations that may be performed on one or more portions of data. Modification operations may include preparing data (e.g., cleaning data, normalizing data, filtering data), building binaries and/or objects, software deployment functions (e.g., continuous integration functions, continuous deployment functions), and/or the like. Visualization functions may include generating graphical representations (e.g., plots, tables, graphs, maps, charts) of data and/or other graphical user interfaces. The pipeline of operations may define an order in which the functions are applied to data. The pipeline of operations may include a linear pipeline or a branching pipeline.

In some embodiments, a function may refer to one or more groupings of code that perform one or more specific operations on data. A set of functions may refer to a grouping of one or more functions. Operations on data may include processes that modify the data (e.g., change the data, create new data based on the data, delete the data, combine the data with other data), processes that visualize the data (e.g., in a plot, in a table, in a chart, in a map), and/or other operations of the data. In some embodiments, functions may be specific to the data (e.g., the type of data accessed), the user (e.g., the type of user, user's privilege level), and/or other information. The functions may be selected by users to generate one or more pipelines of operations on the data.

In some embodiments, the pipeline interaction engine 204 functions to dynamically generate a pipeline 220. For example, a pipeline 220 may be updated/modified when users select a new function for inclusion in the pipeline 220. The pipeline may be updated/modified when users remove a function from the pipeline. The pipeline of operations may be updated/modified when users change the ordering of functions within the pipeline.

In some embodiments, the pipeline interaction engine 204 functions to display pipelines 220. For example, the functions selected by users may be displayed within a user interface, with the functions listed in a given order based on the users' selections. Users may use the displayed pipeline to make changes to the pipeline and/or the displayed functions. Users may use the displayed pipeline to add a new function (e.g., to the beginning, to the end, or within the pipeline), remove an existing function from the pipeline, or rearrange the order of the functions within the pipeline. Users may use the displayed pipeline to view information regarding the functions within the pipeline (e.g., properties of the function, arguments/variables of the functions, code of the functions, data transformations by the functions, and/or other pipeline node information 222) and/or to modify the code of the functions within the pipelines.

In some embodiments, the pipeline interaction engine 204 functions to generate dynamic visualizations of pipelines 220. Dynamic visualizations of pipelines 220 may be associated with levels of granularity. For example, the pipeline interaction engine 204 may generate a dynamic visualization of a pipeline 220 and receive one or more user inputs indicating one or more zoom-in (or, drill-down) actions and/or one or more zoom-out (or, drill-up) actions. In some embodiments, the pipeline interaction engine 204 updates dynamic visualizations in real-time, thereby allowing a user to interact (e.g., zoom-in, zoom-out) with a pipeline 220 in real-time. For example, a dynamic visualization of a pipeline 220 may comprise a two-dimensional representation of a pipeline 220 (e.g., as shown in FIG. 3A), and the pipeline interaction engine 204 may, in response to user input, zoom-in on various portions of the pipeline to provide higher levels of granularity, and/or zoom-out to provide lower levels of granularity. In some embodiments, zooming-in may cause the dynamic visualization to display additional information of the pipeline (e.g., some or all node information 220 associated with that portion of the pipeline 220). Zooming-out may cause the dynamic visualization to display less information of the pipeline (e.g., less or none of the node information 222 associated with that portion of the pipeline 220).

Although 2D dynamic visualization of pipelines 220 are primarily discussed herein, it will be appreciated that dynamic visualization may also include three-dimensional (3D) representations of pipelines 220. Accordingly, the pipeline interaction engine 220 may update the dynamic visualizations to rotate/display dynamic visualizations of pipelines within 360 degrees. The pipeline interaction engine 204 may also switch between 2D and 3D views (e.g., based on user input).

In some embodiments, the pipeline interaction engine 204 functions to update dynamic visualizations while maintaining one or more spatial relationship properties of the pipeline 220. For example, nodes of a pipeline may be spaced within various distances of each other in a dynamic visualization. As the pipeline interaction engine 204 zooms-in and/or zooms-out, the absolute distance may change, but the relative distance may stay the same. For example, a default dynamic visualization of a pipeline 220 may show two nodes that are 1" apart (and connected by an edge), another node that is 1.5" from the second node (and connected by another edge), and so forth. If a pipeline interaction engine 204 zooms-in (e.g., a 150% zoom) on a portion of the pipeline with those nodes, the pipeline processing engine 204 may update the dynamic visualization while maintaining the same relative distance based on the zoom level (e.g., 150%).

In some embodiments, the spatial properties of a dynamic visualization of a pipeline 220 may indicate a processing time (e.g., build time, execution time) and/or other computing resource requirements (e.g., memory requirements, processing power requirements, bandwidth requirements) associated with the pipeline, and/or portions thereof. For example, the length of a connection between two nodes may indicate a processing time to perform that portion of the pipeline. Additional spatial properties (e.g., size of nodes, width of connections) may indicate the same or different computing requirements, and/or indicate node information 222. For example, a size of node may indicate a number of associated datasets and/or an amount of data in the associated datasets.

In some embodiments, the pipeline interaction engine 204 determines a type of information (e.g., functions, datasets) and/or an amount of information to present for various levels of granularity. For example, the pipeline interaction engine 204 may determine the type of information and the amount of information to present for a particular dynamic visualization based on contextual information 224. Contextual information 224 may be stored as metadata. Contextual information 224 may include usage history (e.g., how often a pipeline and/or pipeline paths are executed overall and/or by particular users or groups of users, how often particular datasets are used/interacted with overall and/or by particular users or groups of users), user favorites (e.g., bookmarked pipelines, paths, datasets, functions), desired objectives (e.g., building a particular object, executing a particular pipeline or path), user privileges, and/or the like. For example, a user may routinely interact with particular datasets, while rarely interacting without other datasets. Accordingly, the pipeline interaction engine 204 may present the datasets that the user routinely uses even if the current dynamic visualization of the pipeline is at a relatively low level of granularity (e.g., a default zoom level), while the pipeline interaction engine 204 may only present the other datasets at relatively high levels of granularity (e.g., a 300% zoom level). Accordingly, two different users may view the same pipeline 220 but be presented with different dynamic visualizations presenting different information (e.g., node information 222) associated with that pipeline. Similarly, when the pipeline interaction engine 204 zooms-in and/or zooms-out, the two different users may be presented with different information even though they are viewing the same pipeline at the same zoom level.

In some embodiments, the pipeline interaction engine 204 determines spatial relationships of a pipeline. The pipeline interaction engine 204 may determine spatial relationships based on computing resource requirements, as discussed elsewhere herein, and/or based on contextual information 224. For example, different users may have different users privileges. A user with higher privileges (e.g., a power user, project manager, administrator) may be given access to more computing resources, which may result in faster processing times for pipeline executions, which may be represented by relatively shorter connections between particular nodes of a pipeline. In some embodiments, if a privilege level changes, and/or other contextual information 224 changes, the pipeline interaction engine 204 may update the dynamic visualization of the pipeline accordingly (e.g., in real-time). For example, if a user is viewing a dynamic visualization a pipeline 220, and the user's privileges get increased (e.g., by project manager), particular node connections may become shorter. In another example, when requirements/dependencies changes, that may also be dynamically reflected by shortening or lengthening connections, and/or changing other spatial properties.

The pipeline schedule engine 206 may function to generate pipeline schedules 226. A pipeline schedule 226 may indicate one or more pipelines/paths to execute and when to execute them. For example, a particular path may be scheduled for execution daily at 6 AM, while another path may be scheduled for execution weekly on Monday at 10 AM. The pipeline schedule engine 206 may generate pipeline schedules 226 manually (e.g., in response to user input) and/or automatically. For example, a user may specify one or more pipelines 220 (e.g., using one or more pipeline identifiers associated with the one or more pipeline 220), and/or one or more paths (e.g., via one or more path identifiers), and a specific date/time and/or frequency that they should be executed.

In some embodiments, the pipeline schedule engine 206 may function to present pipeline schedules 226. For example, the pipeline schedule engine 206 may apply visual indicators (e.g., graphical overlays) on to a dynamic visualization of a pipeline 220. Visual indicators may include highlighting and providing/changing colors of nodes and/or connections within a dynamic visualization of a pipeline 220. For example, the connections of a first scheduled path may be blue, the connections of a second scheduled path may be red, and/or the like. The schedule information (e.g., execution time, frequency) may be presented in the dynamic visualization of the pipeline 220 (e.g., in response to user input, such as a mouseover).

In some embodiments, the pipeline schedule engine 206 may present pipeline schedules 226 based on context. For example, a user may have a desired objective (e.g., build various objects, view various datasets), and in order to ensure they have the most recent data (e.g., objects, datasets), the pipeline schedule engine 206 may present one or more pipeline schedules to obtain the desired objective. The presented pipeline schedules may also represent the most computationally efficient means of obtaining the desired objective.

The pipeline processing engine 208 may function to execute and/or interpret pipelines 220 and/or portions thereof. For example, the pipeline processing engine 208 may perform the functions on the datasets as indicated by the pipeline 220. Executions may be performed on-demand (e.g., based on user input) and/or automatically (e.g., based on a schedule).

The communication engine 210 may function to send requests, transmit and, receive communications, and/or otherwise provide communication with one or a plurality of systems. In some embodiments, the communication engine 210 functions to encrypt and decrypt communications. The communication engine 210 may function to send requests to and receive data from one or more systems through a network or a portion of a network. Depending upon implementation-specific considerations, the communication engine 210 may send requests and receive data through a connection, all or a portion of which may be a wireless connection. The communication engine 210 may request and receive messages, and/or other communications from associated systems. Communications may be stored in the dynamic pipeline visualization system datastore 212.

FIG. 3A-C depicts diagrams 300 of example dynamic visualizations of a pipeline (e.g., a pipeline 220) according to some embodiments. In the example of FIG. 3A, a first dynamic visualization (e.g., a default view) of a pipeline is generated and presented in a graphical user interface at a first level of granularity (e.g., a default level of granularity). The dynamic visualization of the pipeline includes nodes 320-334 and connections 350-386. The pipeline includes various spatial relationships (e.g., distances between nodes), which may indicate a processing time for operations, and/or the like, as discussed elsewhere herein. In the example of FIG. 3B, a second dynamic visualization of the pipeline is presented in the graphical user interface at a second level of granularity (e.g., a higher-level of granularity). More specifically, nodes 302-310 and connections 350-358 are shown in a relatively larger scale and include pipeline node information 302A-C, 304A, 306A-D, 308A-C, 310A-B not present in the first dynamic visualization. For example, the pipeline node information (e.g., pipeline node information 222) may include functions, datasets, and/or the like, as discussed elsewhere herein. In the example of FIG. 3B, the spatial relationships (e.g., relative distances between nodes, relative sizes of the nodes) are also maintained relative to the first dynamic visualization of FIG. 3A.

In the example of FIG. 3C, a first pipeline schedule 390 and a second pipeline schedule 392 are overlaid on a dynamic visualization of the pipeline. The pipeline schedules 390-392 are presented using different line-weights for the connections between nodes, although it will be appreciated that other visual indicators may be used as well (e.g., coloring, highlighting, and/or the like). The dashed-line represents a protential (e.g., recommended) pipeline 394 based on the existing first and second pipeline schedules 390-392 and/or other information (e.g., other pipeline schedules, context information, and/or the like). For example, rather than performing or scheduling a new pipeline execution, which may be computationally expensive, the dynamic pipeline visualization system 102 may suggest the potential pipeline 394 from a set of scheduled pipelines. For example, if a user requests to run or schedule a new pipeline execution, but a pipeline schedule already exists for that pipeline, or that new pipeline execution includes paths that are already scheduled for execution in another pipeline schedule within a predetermined amount of time (e.g., it may not use pipeline schedules that are scheduled too far in advance of the requested execution time for the new pipeline), then the dynamic pipeline visualization system 102 may present the protentional pipeline. In some embodiments, several different protentional pipelines may be generated and/or presented, and the dynamic pipeline visualization system 102 may indicate a processing time and/or other computing requirements associated with each potential pipeline (e.g., using visual indicators). This may allow, for example, a user to prioritize computational efficiency over fresh data, or vice versa.

Figure 4:
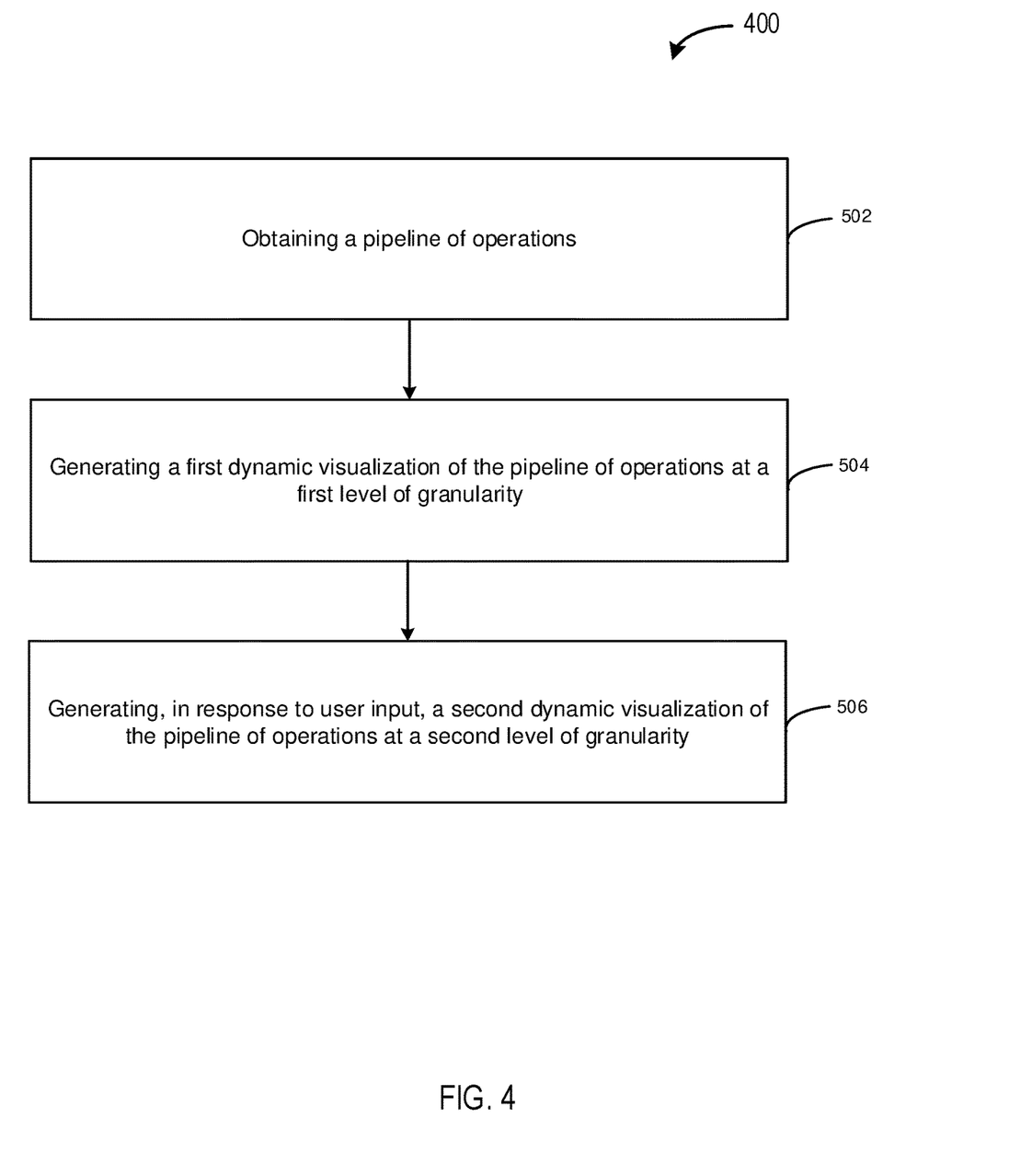
FIG. 4 depicts a flowchart of an example of a method of generating dynamic visualizations of a pipeline according to some embodiments.

FIG. 4 depicts a flowchart 400 of an example of a method of generating dynamic visualizations of a pipeline according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed but may have been included for the sake of illustrative clarity.

In step 402, a dynamic pipeline visualization system (e.g., dynamic pipeline visualization system 102) obtains a pipeline of operations (e.g., pipeline of operations 220). The pipeline of operations may include a plurality of functions providing any of one or more modification operations or visualization operations for a plurality of datasets. An example pipeline of operations is shown in FIGS. 3A-C. In some embodiments, a management engine (e.g., management engine 202) obtains the pipeline of operations from a datastore (e.g., dynamic pipeline visualization system datastore 212).

In step 404, the dynamic pipeline visualization system generates a first dynamic visualization of the pipeline of operations at a first level of granularity. An example is shown in FIG. 3A. In some embodiments, a pipeline interaction engine (e.g., pipeline interaction engine 204) generates the first dynamic visualization of the pipeline of operations at the first level of granularity (e.g., a default level of granularity). In some embodiments, the type and/or amount of information associated included in the dynamic visualization, and/or other dynamic visualizations described herein, are determined based on context (e.g., contextual information 224).

In step 406, the dynamic pipeline visualization system generates, in response to user input, a second dynamic visualization of the pipeline of operations at a second level of granularity. In one example, the second level of granularity may be a higher level of granularity relative to the first level of granularity (e.g., a zoomed-in view relative the first dynamic visualization). An example of a zoomed-in view is shown in FIG. 3B. For example, the second dynamic visualization may present a portion of the pipeline of operations at a larger relative scale and/or present more information (e.g., more datasets/functions, larger labels/text, and/or the like) than the first dynamic visualization.

In another example, the second level of granularity may be a lower level of granularity relative to the first level of granularity (e.g., a zoomed-out view relative the first dynamic visualization). For example, the second dynamic visualization may present a portion of the pipeline of operations at a smaller relative scale and/or present less information (e.g., fewer datasets and/or functions, smaller labels/text, and/or the like) than the first dynamic visualization. An example of a zoomed-in view is shown in FIG. 3B.

In some embodiments, the dynamic pipeline visualization system may generate any number of such dynamic visualizations of a pipeline of operations. For example, the pipeline interaction engine may generate a third dynamic visualization of the pipeline of operations at a third level of granularity (e.g., a level of granularity in between the first and second levels of granularity, a level of granularity lower than the second level of granularity, and so forth).

In some embodiments, the dynamic pipeline visualization system maintains the same relative spatial relations for the various dynamic visualizations of the pipeline of operations. For example, the first, second and third dynamic visualizations of the pipeline may have the same relative distance between nodes of the pipeline operations, although they may each present different levels of granularity. In some embodiments, the spatial relationships may represent a relative or absolute processing (e.g., execution) time for operations associated with those nodes.

In some embodiments, the dynamic pipeline visualization system may obtain a plurality of pipeline schedules (e.g., pipeline schedules 228). Each of the pipeline schedules may indicate a time and/or frequency a respective pipeline of the plurality of pipeline schedules is to be executed. In some embodiments, the dynamic pipeline visualization system may overlay a respective visual indicator for each of the plurality of pipeline schedules on various dynamic visualizations (e.g., the first dynamic visualization of the pipeline of operations at the first level of granularity, the second dynamic visualization of the pipeline of operations). Each of the respective visual indicators may identify a corresponding pipeline schedule of the plurality of pipeline schedules.

HARDWARE IMPLEMENTATION

Figure 5:
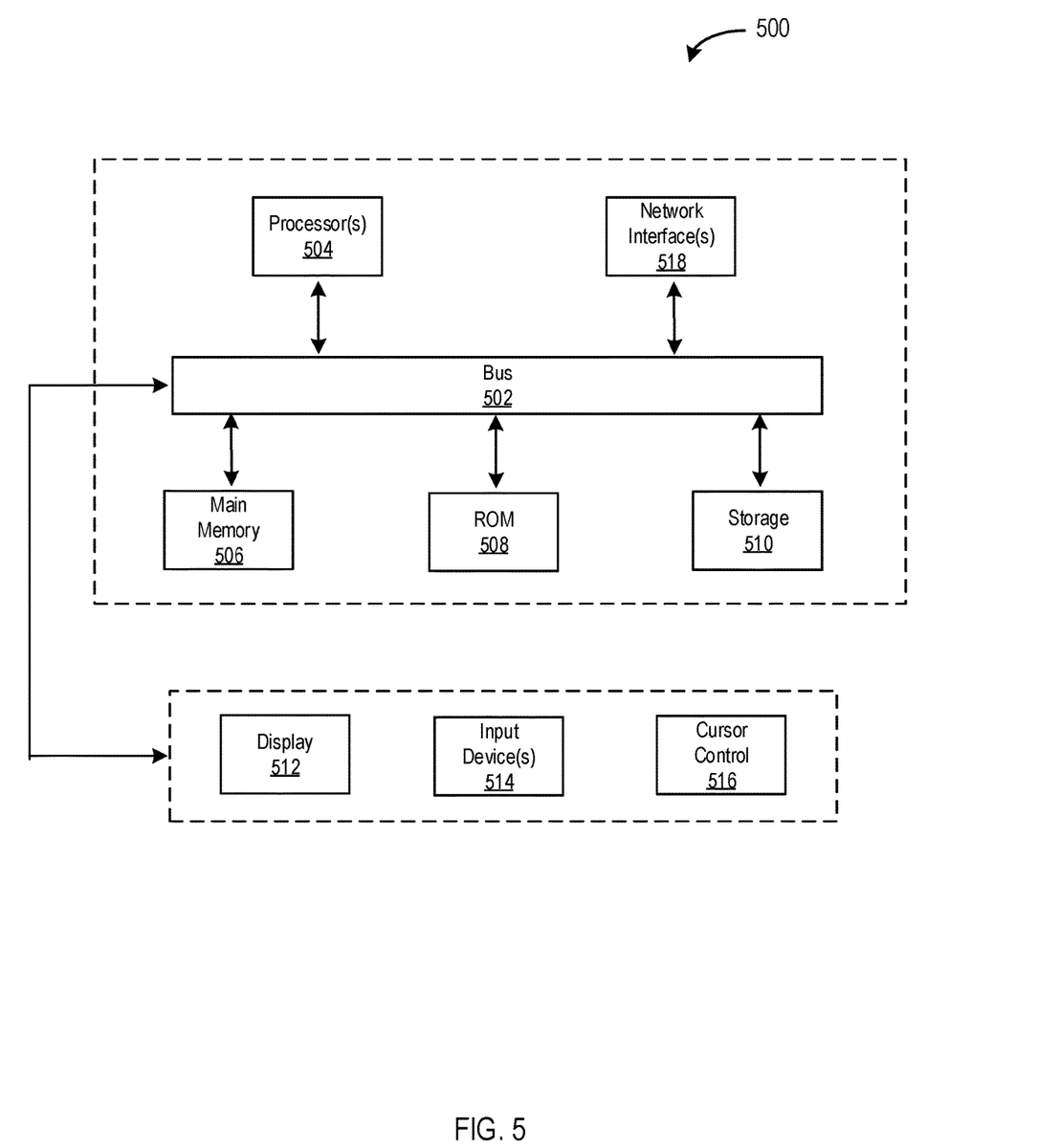
FIG. 5 depicts a diagram of an example computer system for implementing the features disclosed herein.

FIG. 5 depicts a block diagram of an example of a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
one or more processors; and
a memory storing instructions that, when executed by the one or more processors, cause the system to perform:
obtaining a pipeline of operations associated with datasets, the pipeline of operations comprising nodes connected by edges, each of the nodes including one or more modification operations to be performed on the datasets and the edges indicating spatial distances between the nodes, the spatial distances indicating processing times of the one or more modification operations;
obtaining pipeline schedules, each of the pipeline schedules indicating a time or frequency a respective pipeline associated with the pipeline schedules is to be executed;
generating a first dynamic visualization of the pipeline of operations;
receiving an indication that an access privilege of an entity associated with the pipeline has changed, wherein the change of the access privilege comprises an increase or a decrease in the access privilege, thereby changing the processing times or dependencies corresponding to the nodes; and
in response to receiving the indication, modifying the first dynamic visualization of the pipeline by shortening the spatial distances between the nodes in response to the access privilege increasing, increasing the spatial distances between the nodes in response to the access privilege decreasing, or adjusting the connections between the nodes to signify the changes in the processing times, the increase or decrease in the access privilege, or in the dependencies.

2. The system of claim 1, wherein the first dynamic visualization illustrates a pipeline having a highest computational efficiency compared to other pipelines.

3. The system of claim 1, wherein the instructions, when executed, further cause the system to perform:
generating a second dynamic visualization of the pipeline of operations in which second spatial distances between second nodes match the spatial distances between the nodes, the second dynamic visualization having a different granularity compared to the first dynamic visualization.

4. The system of claim 1, wherein respective sizes of the nodes indicate computing requirements of the nodes.

5. The system of claim 1, wherein respective sizes of the nodes indicate amounts of information to be processed at the nodes.

6. The system of claim 1, wherein the generating of the first dynamic visualization comprises determining respective granularities of the nodes based on frequencies of access of datasets corresponding to the nodes; and populating the nodes at the determined granularities.

7. The system of claim 6, wherein the determining of the respective granularities comprises determining that a first frequency of access of a first dataset is higher than a second frequency of access of a second dataset; and determining that the first dataset has a lower granularity compared to the second dataset.

8. The system of claim 1, wherein the modifying of the first dynamic visualization of the pipeline is based on contextual information, the contextual information comprising one of a frequency of execution of the pipeline or a frequency of execution of datasets corresponding to the nodes.

9. The system of claim 1, wherein the modifying of the first dynamic visualization of the pipeline is based on the changes in processing times.

10. A method being implemented by a computing system including one or more physical processors and a storage media storing machine-readable instructions, the method comprising:
   obtaining a pipeline of operations associated with datasets, the pipeline of operations comprising nodes connected by edges, each of the nodes including one or more modification operations to be performed on the datasets and the edges indicating spatial distances between the nodes, the spatial distances indicating processing times of the one or more modification operations;
   obtaining pipeline schedules, each of the pipeline schedules indicating a time or frequency a respective pipeline associated with the pipeline schedules is to be executed;
   generating a first dynamic visualization of the pipeline of operations, wherein the generating of the first dynamic visualization comprises determining respective granularities of the nodes based on frequencies of access of datasets corresponding to the nodes; and populating the nodes at the determined granularities, wherein the determining of the respective granularities comprises determining that a first frequency of access of a first dataset is higher than a second frequency of access of a second dataset, and determining that the first dataset has a lower granularity compared to the second dataset;
   receiving an indication that an access privilege of an entity associated with the pipeline has changed, thereby changing the processing times or dependencies corresponding to the nodes; and
   in response to receiving the indication, modifying the first dynamic visualization of the pipeline by changing the spatial distances between the nodes or adjusting the connections between the nodes to signify the changes in the processing times or in the dependencies.

11. The method of claim 10, wherein the receiving of the indication comprises receiving an indication that the access privilege has increased, and the modifying of the pipeline comprises shortening the spatial distances between the nodes in response to receiving an indication that the access privilege has increased.

12. The method of claim 10, wherein the first dynamic visualization illustrates a pipeline having a highest computational efficiency compared to other pipelines.

13. The method of claim 10, further comprising:
   generating a second dynamic visualization of the pipeline of operations in which second spatial distances between second nodes match the spatial distances between the nodes, the second dynamic visualization having a different granularity compared to the first dynamic visualization.

14. The method of claim 10, wherein respective sizes of the nodes indicate computing requirements of the nodes.

15. The method of claim 10, wherein respective sizes of the nodes indicate amounts of information to be processed at the nodes.

16. The method of claim 10, wherein the modifying of the first dynamic visualization of the pipeline is based on contextual information, the contextual information comprising one of a frequency of execution of the pipeline or a frequency of execution of datasets corresponding to the nodes.

17. The method of claim 10, wherein the modifying of the first dynamic visualization of the pipeline is based on the changes in processing times.

18. A method being implemented by a computing system including one or more physical processors and a storage media storing machine-readable instructions, the method comprising:
   obtaining a pipeline of operations associated with datasets, the pipeline of operations comprising nodes connected by edges, each of the nodes including one or more modification operations to be performed on the datasets and the edges indicating spatial distances between the nodes, the spatial distances indicating processing times of the one or more modification operations;
   obtaining pipeline schedules, each of the pipeline schedules indicating a time or frequency a respective pipeline associated with the pipeline schedules is to be executed;
   generating a first dynamic visualization of the pipeline of operations;
   receiving an indication that an access privilege of an entity associated with the pipeline has changed, wherein the change of the access privilege comprises an increase or a decrease in the access privilege, thereby changing the processing times or dependencies corresponding to the nodes; and
   in response to receiving the indication, modifying the first dynamic visualization of the pipeline by shortening the spatial distances between the nodes in response to the access privilege increasing, increasing the spatial distances between the nodes in response to the access privilege decreasing, or adjusting the connections between the nodes to signify the changes in the processing times, the increase or decrease in the access privilege, or in the dependencies.

* * * * *